(12) United States Patent
Schmider

(10) Patent No.: US 7,000,936 B2
(45) Date of Patent: Feb. 21, 2006

(54) BICYCLE HAVING INTERNALLY ROUTED CONTROL CABLES

(76) Inventor: John Schmider, 1856 John Street, Thornhill, Ontario (CA) L3T 1Z1

( * ) Notice: Subject to any disclaimer, the term of this patent is extended or adjusted under 35 U.S.C. 154(b) by 0 days.

(21) Appl. No.: 10/807,164

(22) Filed: Mar. 24, 2004

(65) Prior Publication Data

US 2004/0188976 A1    Sep. 30, 2004

Related U.S. Application Data

(60) Provisional application No. 60/457,555, filed on Mar. 26, 2003.

(51) Int. Cl.
*B62K 21/02* (2006.01)

(52) U.S. Cl. ................. 280/281.1; 74/551.1; 74/502.4; 74/502.6; 74/500.5

(58) Field of Classification Search ............. 280/281.1, 280/288.3 X; 74/551.1 X, 502.4 X, 502.6 X, 74/500.5 X
See application file for complete search history.

(56) References Cited

U.S. PATENT DOCUMENTS

| | | | |
|---|---|---|---|
| 689,217 A * | 12/1901 | Palmer | 74/551.3 |
| 4,583,755 A * | 4/1986 | Diekman et al. | 280/281.1 |
| 4,585,246 A | 4/1986 | Diekman et al. | |
| 4,768,798 A | 9/1988 | Reed et al. | |
| 4,770,435 A * | 9/1988 | Cristie | 280/279 |
| 4,915,404 A * | 4/1990 | Chonan | 280/288.3 |
| 4,917,397 A | 4/1990 | Chonan | |
| 4,930,798 A * | 6/1990 | Yamazaki et al. | 280/261 |
| 5,236,212 A | 8/1993 | Duehring et al. | |
| 5,273,302 A | 12/1993 | Ureel | |
| 5,323,664 A * | 6/1994 | Fairfield et al. | 74/551.3 |
| 5,456,135 A | 10/1995 | Li | |
| 5,478,100 A | 12/1995 | McDermitt, Jr. et al. | |
| 5,727,427 A | 3/1998 | Nien | |
| 5,737,967 A | 4/1998 | Hartley | |
| 5,803,207 A * | 9/1998 | Nielsen | 188/24.12 |
| 5,842,385 A * | 12/1998 | Su | 74/551.3 |
| 5,964,123 A * | 10/1999 | Arbeiter | 74/489 |
| 6,725,978 B1 * | 4/2004 | Karpowich | 188/20 |
| 2005/0029772 A1 * | 2/2005 | Oi | 280/281.1 |

FOREIGN PATENT DOCUMENTS

DE          19712326 A1    10/1998

* cited by examiner

*Primary Examiner*—Tony Winner
(74) *Attorney, Agent, or Firm*—Bereskin & Parr

(57) ABSTRACT

An internally supported cable system control for a bicycle that does not interfere with the steering mechanism and does not require the structural integrity of the bicycle frame to be compromised. In the disclosed internal cable system, the control cables are routed through a passageway in the gooseneck and the bicycle frame to the mechanism or device that they are designed to control. The gooseneck design is unique in that it allows for an unobstructed passageway for the cables to travel into the steering tube and frame, while allowing for both sliding forward and rearward as well as raising and lowering, as desired by the bicycle rider. For aesthetic reasons, a casing may be added to cover the cabling between the control levers and the gooseneck.

18 Claims, 5 Drawing Sheets

BICYCLE HAVING INTERNALLY ROUTED CONTROL CABLES

This patent claims the benefit under 35 USC 119(e) of provisional application No. 60/457,555 filed on Mar. 26, 2003 which is incorporated herein in full by this reference to it.

FIELD OF THE INVENTION

The subject invention relates to internally supporting bicycle control cables, and more specifically to routing control cables through various components of all types of bicycles including, but not limited to, standard, racing and mountain bikes and to headsets for bicycles.

BACKGROUND OF THE INVENTION

Bicycles have been utilized as a means of transportation for over a hundred years and continue to grow in popularity. The mountain bike is one type of bike that has become more and more popular in recent years. These types of bikes are often used in rough terrain.

Operational or control cables typically extend from control levers, often secured to the bicycle handlebars, used to control both front and back wheel braking capacities and front and back shifting mechanisms such as the front and rear derailleurs. The operational or control cables are normally mounted along the outside of the tubular frame members, with various attachment members, such as clips. The cables can interfere with either the rider or other components of the bicycle, such as tool compartments, which are also attached to the frame exterior. In the case of mountain bikes, externally located cables are susceptible to damage from the surrounding environment, such as tree branches. Further, the cables also detract from the aesthetic appearance of the frame, as they may cover art or graphic logos on the bike frame.

To eliminate the appearance of cables on the exterior of bicycle frames, prior art attempts have been made to extend the cables through the interiors of tubular frame components. An early example is described in French Patent No. 982,877, which shows a bicycle frame in which the top tube consists of a hollow, tubular member having a forward cable outlet at a location near the head tube socket which is attached to the top tube, and a rearward cable outlet adjacent to the seat mast of the bicycle frame. A later example is described in German Patent Application No. 19712326, where at least one section of the base frame has an extruded profile tube section with at least one channel to accept a cable.

While the internal cable system of this type of frame eliminates the appearance of the cable on the exterior of the frame components, the forming of several openings along the top tube of a bicycle frame tends to weaken the wall of that tube, which would require either that the tube be made of a strong but heavy material such as steel, or that the tube walls be thickened if made of a relatively light material which would also add to the overall weight of the frame.

A more recent example of an internal cable routing system can be found in U.S. Pat. No. 5,478,100, where the cables are located inside of the top tube or down tube. However, the cables are still exposed from the brake or shift levers until they are routed into the frame some distance away.

In U.S. Pat. No. 4,768,798, the cables are routed directly into the frame at a point in front of the steering axis. In this case, the cables are also exposed until they reach the frame. In addition, the complexity of the steering tube is increased so that the cables can be routed through the tube and not interfere with the steering mechanism.

In recent years, it has also become recognized that the old-fashioned stationary handlebar and stem bicycle configuration can cause health problems such as lower back pain and wrist pain, due to the crouched body position necessary during bike riding. Many issued patents claim bicycle handlebars or stems that can be adjusted in one manner or another. U.S. Pat. Nos. 5,133,224, 5,273,302, 5,456,135, 5,727,427 and 5,737,967 describe various systems for adjusting bicycle handlebars or bicycle stems. However, these prior art adjustable handlebar stems would interfere with any internal cable routing system.

Accordingly, there is a need for an internal cable system for a bicycle frame that does not interfere with the steering mechanism and does not compromise the structural integrity of the tubes housing the cable, while permitting adjustable handlebars or stems.

SUMMARY OF THE INVENTION

In one aspect, the present invention is an internal control cabling system that does not interfere with the steering mechanism and does not compromise the structural integrity of the bicycle frame. In the disclosed internal control cable system, the control cables are routed through the interiors of the handlebar stem or gooseneck and, optionally, one or more parts of the bicycle frame, such as a head or steering tube, to the mechanism or device that they are designed to control. The headset design is unique in that it allows for one or more of, an unobstructed passageway for the cables to travel into the steering tube of the frame; sliding of the handlebar forward or rearward; raising and lowering of the handlebar, as desired by the bicycle rider. For aesthetic reasons, a casing can be added to cover the cabling between the control levers and the gooseneck. In other aspects, the invention provides one or more parts for a headset such as a fork with a fork yoke, a handlebar stem adapted to be inserted into the fork yoke and a handlebar adapted to be attached to the handlebar stem. Connections between these components permit internal passageways in the handlebar stem and fork yoke to remain open or permit the arrangement of at least one of these components to be adjusted relative to another. The description above is intended only to introduce the reader to the invention and other aspects of the invention may lie in a combination or sub-combination of elements described above or in other parts of this patent, or as described in the claims.

BRIEF DESCRIPTION OF THE DRAWINGS

Other advantages of the present invention will be readily appreciated as the same becomes better understood by reference to the following detailed description when considered in connection with the accompanying drawings of an exemplary embodiment wherein.

DETAILED DESCRIPTION OF THE INVENTION

Figure 1:
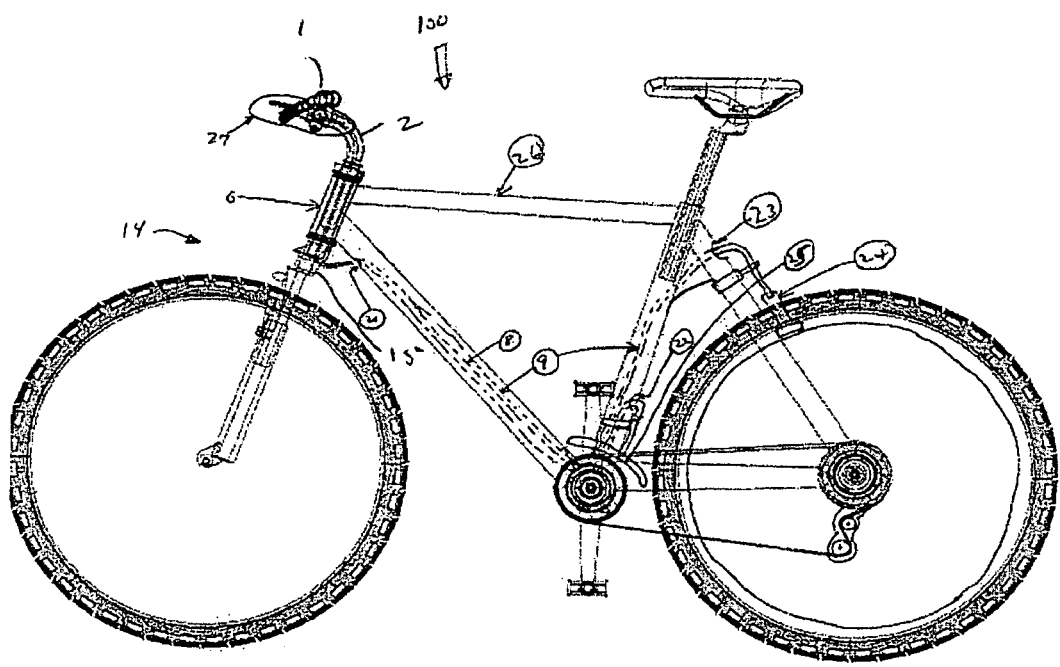
FIG. 1 is a side view of a bicycle, which illustrates the preferred embodiment of the invention.

Referring to the Figures, wherein like numerals indicate like or corresponding parts throughout the several views, the preferred embodiment of the invention consists of a bicycle 100 having a frame 26 that includes a head tube or steering head 6 that is adapted to receive a handlebar stem 2 in its upper end 70 and a fork stem or yoke 12 of a fork 14 through its lower end 72. In the preferred embodiment, the handlebar stem 2 is adjustable and may be referred to as a "gooseneck". The particular gooseneck 2 described herein is an open-ended tube bent so that, with a first end 16 of the gooseneck 2 oriented substantially vertically, a second end 18 of the gooseneck 2 is at an angle from the vertical of greater than 45 degrees. In a preferred embodiment, the angle between the two ends 16, 18 of the handlebar stem is substantially 90 degrees, or perpendicular.

Figure 4:
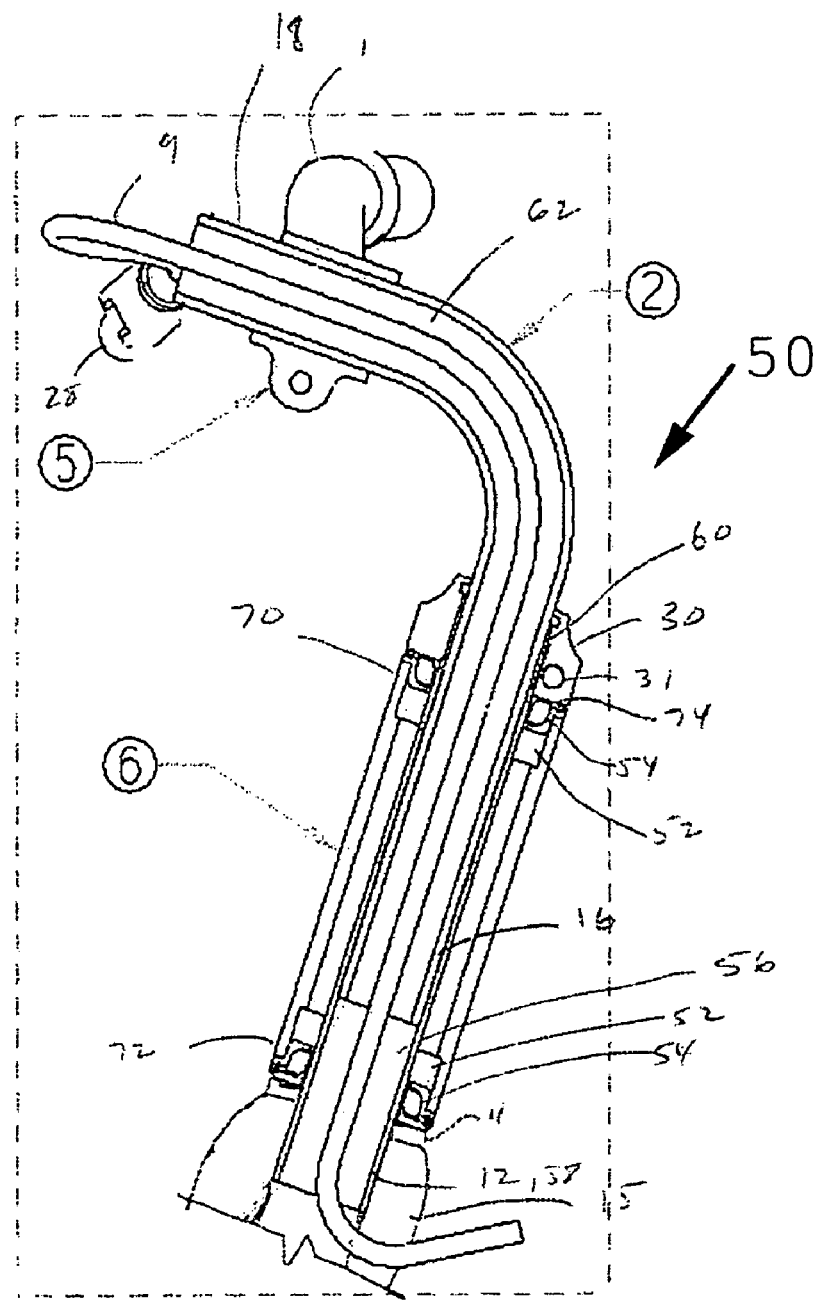
FIG. 4 is a cross-sectional view of the handle bar and stem gooseneck assembly similar to that of FIG. 3, illustrating the internal cabling.

As best seen in FIG. 4, but with reference to the other Figures, the bicycle 100 has a headset 50 that includes the fork 14, handlebar stem 2, handlebar 1, connectors between those components and connectors between the headset 50 and the head tube 6. The head tube 6 has a counter bore 52 on each of its upper and lower ends, each counter bore 52 holding a bearing assembly 54. A fork ring 11 is fitted over a bottom end 58 of the fork yoke 12 and rests on a fork bridge 15. The fork 14 slides into the lower end 70 of the head tube 6 so that the fork bridge 15 bears on the fork ring 11 which in turn bears on the lower bearing assembly 54. The fork bridge 15 is attached to the outside of the fork yoke 12 so as to not close an opening in the bottom end 58 of the fork yoke 12 to an internal passageway 56 through the fork yoke 12. The top end 60 of the fork yoke 12 protrudes above the upper end 70 of the head tube 6 and is externally threaded and split with two longitudinal slits (not labeled). The top end 60 of the fork yoke 12 is open and receives the first end 16 of the handlebar stem 2. A head locking collar 30 is internally threaded and screwed onto the upper end 70 of the fork yoke 12. An abutment 74 on the bottom of the head locking collar 30 bears on the bearing assembly 54 in the upper end 70 of the head tube 6 to compress the bearing assemblies 54 and hold the fork 14 in the head tube 6. Head locking collar 30 is split with a vertical slit that may be closed with a head collar bolt 31. When the head collar bolt 31 is tightened, the slits in both head locking collar 30 and the top end 60 of the fork yoke 12 are closed. This compresses the top end 60 of the fork yoke 12 about the first end 16 of the handlebar stem 2. In this way, the fork 14 and handlebar stem 2 are frictionally connected together without closing an internal passageway 62 through the handlebar stem 2 or the internal passageway 56 through the fork yoke 12. The head locking collar 30 is also secured in position on the fork yoke 12 to preserve the desired compression on the bearing assemblies 54.

Figure 2:
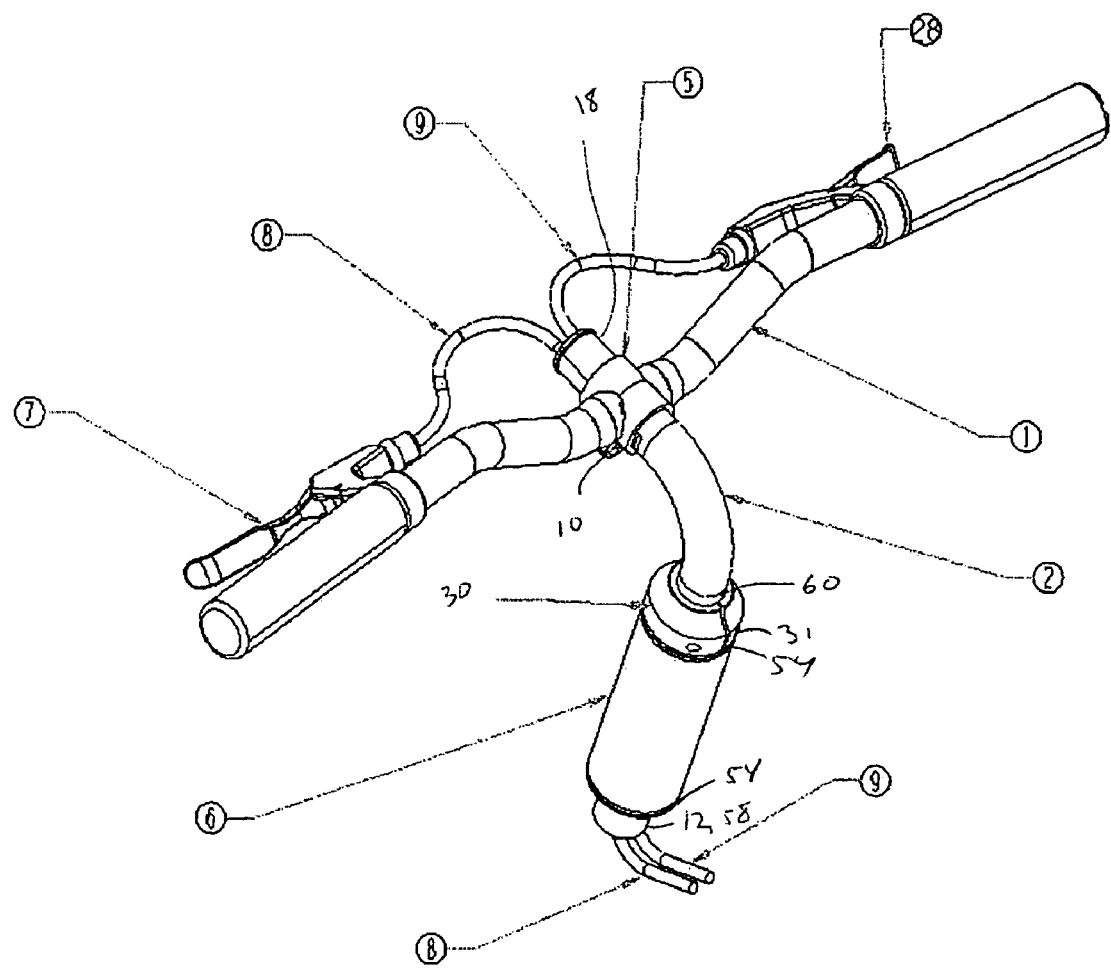
FIG. 2 is an isometric view of the handle bar and stem gooseneck assembly without the casing.
Figure 3:
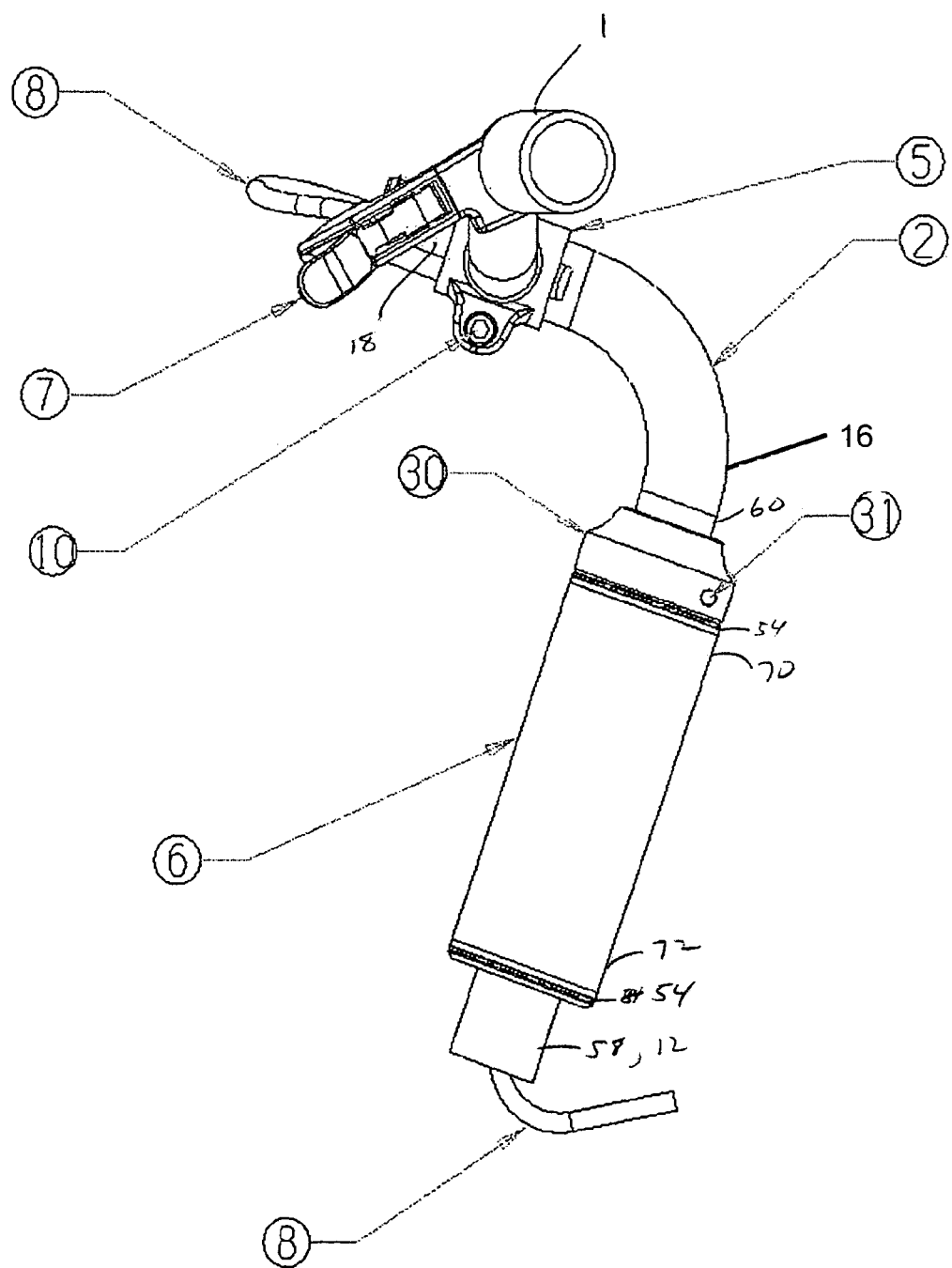
FIG. 3 is a side view of the handle bar and stem gooseneck assembly without the casing.

As best seen in FIGS. 2, 3 and 4, the handlebar stem or gooseneck 2 and handle bar 1 are attached by a handle bar locking collar 5, which is tightened by means of a handle bar collar bolt 10. The proposed arrangement has the advantage of allowing the handle bar 1 to have up/down and fore/aft adjustment to suit a variety of rider sizes and preferences. Referring to FIG. 3, if head collar bolt 31 is loosened in order to free head locking collar 30, then the handle bar 1 and gooseneck 2 assembly can be moved in the direction of the axis of steering head 6, that is substantially in the vertical or up/down direction. If the handle bar collar bolt 10 is loosened, then the handle bar locking collar 5 will loosen such that the handle bar 1 can be moved along the gooseneck 2, providing for substantially fore/aft adjustment of the handle bar 1. The handle bar locking collar 5 connects to the outside of the handlebar stem 2 and so does not close the open second end 18, or the internal passageway 62 of the handlebar stem 2 which may extend forward beyond handle bar locking collar 5.

In the preferred embodiment, first control cable 8, which controls the front derailleur 25, is controlled by first lever 7. Second control cable 9, which controls the rear brake 24, is controlled by second lever 28. The cables pass through the bent stem gooseneck 2. The cables 8, 9 pass out of the bottom of the gooseneck 2, such that the gooseneck 2 acts as a cable conduit, and also out of the bottom of the steering head 6. The cables 8, 9 are then routed into the frame 26 of the bicycle 100 through opening 21. It is obvious to someone skilled in the art that multiple openings could be used on the gooseneck 2 or the frame 26. The cables 8, 9 are then routed through the frame 26 to the mechanism or device that they are meant to control.

In the disclosed embodiment, first control cable 8 is routed into the interior of stem gooseneck 2, steering head 6 and then through the interior of frame 26 via an entrance hole 21, and exits through opening 22, where the cable 8 is then attached to its associated control mechanism, the front derailleur 25. Similarly, the second control cable 9 is routed into the interiors of stem gooseneck 2, steering head 6 and then through the interior of frame 26 via an entrance hole 21, and exits through opening 23, where it is attached to its associated control mechanism, the rear brake 24. The control cables 8, 9 are able to pass through the gooseneck 2 unhindered and without interfering with the steering mechanism, as the gooseneck 2 is essentially an open cable conduit. In passing from the down tube to the seat tube of the frame 26, the cables 8, 9 may exit the frame 26 through an additional opening in the down tube and re-enter the frame 26 through an additional opening in the seat tube. Alternately, the cables 8, 9 may pass through the interior of the bottom bracket of the frame 26 or a portion of the down tube or seat tube extending outside of the bottom bracket.

Figure 5:
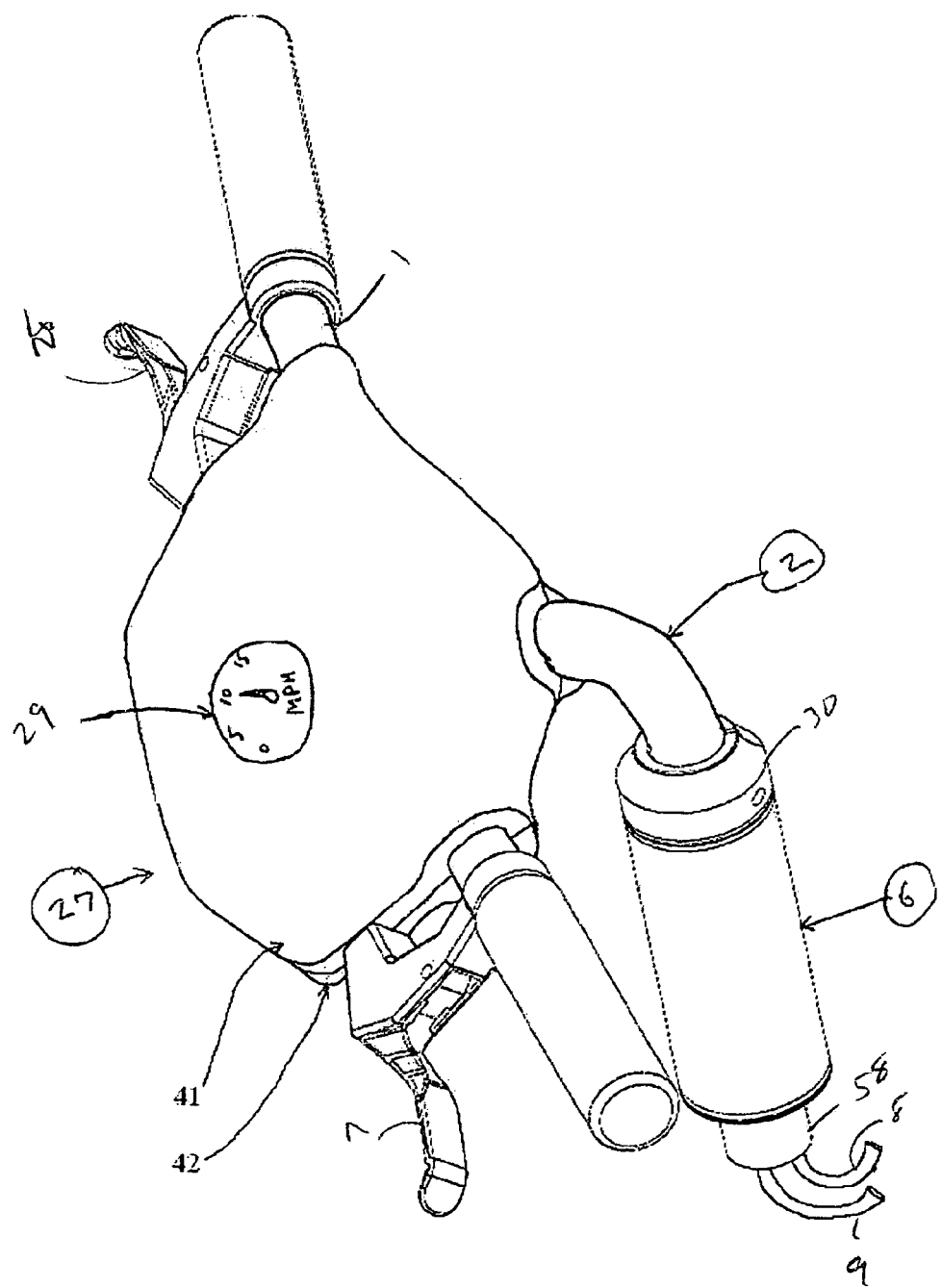
FIG. 5 is an isometric view of the handlebars and stem gooseneck, fully assembled with the casing.

For aesthetic reasons, the handle bar 1, gooseneck 2 and cables 8, 9 in the region of the handle bar 1, may be covered with a casing 27 as illustrated in FIG. 5. In this embodiment, the casing 27 is constructed in a clamshell manner having both an upper half 41 and lower half 42. The two halves 41, 42 can be secured to the handlebar 1 by bolting the two halves 41, 42 together around the handlebar 1, for example. Any other suitable means may be used, including bonding, welding, or riveting the halves together. Alternately, the casing 27 can be attached to the handlebar 1 and handlebar stem 2 directly or by means of intermediate brackets or components.

In a further embodiment, additional accessories can be added to the casing 27, such as a speedometer 29, as shown in FIG. 5. Optionally, any cables associated with the speedometer 29 can be routed through the gooseneck 2 and either into the frame 26 or down the front forks 14 to the speedometer sensor, not shown.

While the form of apparatus described herein constitutes a preferred embodiment of this invention, it is to be understood that the invention is not limited to this precise form of apparatus. For example, additional control cables, levers and derailleurs, brakes, electric wires, or other systems can be included. The frame 26 may also be a different sort of frame, such as a monocoque frame. The components of the headset 50 may be modified in various ways. Further, the casing 27 may not be a clamshell design. These and other modifications may still be within the scope of the invention protected by this patent which is defined by the following claims.

What is claimed is:

1. A bicycle having at least a portion of control cable internally routed comprising:
   a frame, said frame including a head tube;
   a handlebar stem received and supported in said head tube, said handlebar stem having an internal passageway therethrough;
   a handlebar secured to said handlebar stem;
   a control lever secured to said handlebar; and
   a control cable attached to said control lever and extending from said control lever through said passageway in said handlebar stem and attached to a control mechanism,
   wherein the internal passageway of the handlebar stem extends from the head tube to a point forward of where the handlebar is secured to the handlebar stem and the handlebar is secured to the handlebar stem without closing the internal passageway of the handlebar stem.

2. The bicycle of claim 1 wherein the control cable further extends through the head tube and exits from the bottom of the head tube.

3. The bicycle of claim 1 further comprising a fork yoke passing through the head tube and having an internal passageway wherein the handlebar stem is received and supported in the head tube by being received and supported in the fork yoke, the internal passageway of the handlebar stem opens into the internal passageway of the fork yoke and the control cable passes through the passageways of both the handlebar stem and the fork yoke.

4. The bicycle of claim 3 further comprising a collar for connecting the handlebar stem to the fork yoke without closing the internal passageways of the handlebar stem or fork yoke.

5. The bicycle of claim 1 wherein the handlebar stem has a first end received and supported in the head tube and a second end and the handlebar stem is bent such that the second end points forward at an angle greater than 45 degrees from the first end.

6. A bicycle having at least a portion of control cable internally routed comprising:
   a frame, said frame including a head tube;
   a handlebar stem received and supported in said head tube, said handlebar stem having an internal passageway therethrough;
   a handlebar secured to said handlebar stem;
   a control lever secured to said handlebar; and
   a control cable attached to said control lever and extending from said control lever through said passageway in said handlebar stem and attached to a control mechanism,
   wherein the handlebar stem has a first end received and supported in the head tube and a second end and the handlebar stem is bent such that the second end points forward at an angle greater than 45 degrees from the first end,
   and wherein the internal passageway of the handlebar stem extends through the bent portion of the handlebar stem.

7. The bicycle of claim 1 having a connection between the handlebar and the handlebar stem that permits the handlebar to be secured to the handlebar stem in a range of positions along the handlebar stem.

8. The bicycle of claim 7 wherein the handlebar has a collar for securing the handlebar to the handlebar stem without closing the internal passageway of the handlebar stem.

9. The bicycle of claim 1 wherein the handlebar stem is received and supported in the head tube at an adjustable depth of insertion.

10. The bicycle of claim 1 wherein the control cable, after passing through the handlebar stem, passes into the frame and extends through a portion of the frame.

11. The bicycle of claim 1 wherein the handlebar, handlebar stem and control cable are covered by a casing.

12. A set of parts for use as in a headset for a bicycle comprising,
   a) a fork having a fork yoke;
   b) a handlebar stem adapted to be inserted into a first end of the fork yoke;
   c) a connector adapted to be placed around the outside of a portion of the fork yoke and handlebar stem and connect the fork yoke to the handlebar stem,
   wherein the connector comprises a collar adapted to compress the fork yoke and handlebar stem so as to create a frictional connection and wherein the first end of the fork yoke and the collar are threaded such that the collar may be threaded onto the first end of the fork yoke.

13. The set of parts of claim 12 wherein the fork yoke has one or more longitudinal slits in the first end.

14. The set of parts of claim 12 wherein the collar has an abutment adapted to compress a bearing assembly of the headset.

15. The set of parts of claim 12 wherein, the handlebar stem has a first end and a second end, the first end adapted to be inserted into the first end of the fork yoke, and further comprising
   d) a handlebar; and,
   e) a second connector adapted to attach the handlebar to the handlebar stem with the second connector located within a range of positions between the ends of the handlebar stem wherein the handlebar and second connector do not cover the second end of the handlebar stem.

16. The set of parts of claim 15 wherein the second connector includes a collar attached to the handlebar and adapted to grasp the outside of the handlebar stem.

17. The set of parts of claim 15 wherein the handlebar stem is bent such that the second end of the handlebar stem points forward at an angle greater than 45 degrees from the first end of the handlebar stem.

18. The set of parts of claim 15 wherein the handlebar stem has an internal passageway extending between the first end of the handlebar stem and the second end of the handlebar stem.

* * * * *